(12) United States Patent
Su et al.

(10) Patent No.: US 10,776,431 B2
(45) Date of Patent: Sep. 15, 2020

(54) SYSTEM AND METHOD FOR RECOMMENDING CONTENT BASED ON SEARCH HISTORY AND TRENDING TOPICS

(75) Inventors: Hang Su, Sunnyvale, CA (US); Siva Gurumurthy, Sunnyvale, CA (US); Huming Wu, San Jose, CA (US)

(73) Assignee: Oath Inc., New York, NY (US)

( * ) Notice: Subject to any disclaimer, the term of this patent is extended or adjusted under 35 U.S.C. 154(b) by 117 days.

(21) Appl. No.: 13/282,017

(22) Filed: Oct. 26, 2011

(65) Prior Publication Data

US 2013/0110823 A1 May 2, 2013

(51) Int. Cl.
*G06F 16/9535* (2019.01)
(52) U.S. Cl.
CPC .................. *G06F 16/9535* (2019.01)
(58) Field of Classification Search
CPC .................................................. G06F 16/9535
See application file for complete search history.

(56) References Cited

U.S. PATENT DOCUMENTS

| | | | |
|---|---|---|---|
| 2003/0033333 A1* | 2/2003 | Nishino | G06F 16/9562 715/255 |
| 2005/0102259 A1* | 5/2005 | Kapur | G06F 16/9535 |
| 2005/0234877 A1* | 10/2005 | Yu | G06F 7/00 |
| 2010/0100537 A1* | 4/2010 | Druzgalski | G06Q 30/02 707/713 |
| 2012/0016889 A1* | 1/2012 | Dean | G06F 16/951 707/749 |
| 2012/0030018 A1* | 2/2012 | Passmore | G06F 17/30702 705/14.52 |
| 2012/0072432 A1* | 3/2012 | Crosa | G06F 16/9535 707/748 |
| 2012/0330958 A1* | 12/2012 | Xu | G06F 17/16 707/738 |

* cited by examiner

*Primary Examiner* — Van H Oberly
(74) *Attorney, Agent, or Firm* — Pillsbury Winthrop Shaw Pittman LLP

(57) ABSTRACT

Systems and methods for providing content associated with trending topics relevant to a user are described. An interest detection module identifies topics trending in one or more real-time content sources that are relevant to a user. The real-time content source(s) may include, for example, a source of microblog posts or other user-generated data, a news feed, or the like. The topics trending that are relevant to the user are identified by comparing a search history of the user with one or more trending topics stored in a database. A content retriever module is configured to return one or more documents to the user in response to identifying the one or more topics trending that are relevant to the user.

24 Claims, 9 Drawing Sheets

800

My Homepage

Welcome John Doe

802

RECOMMENDED NEWS

- <u>Obama: Spending cuts alone not answer on deficit</u> — 802₁

WASHINGTON (Reuters) — President Barack Obama, taking a combative tone in a standoff with congressional deal with its budget problems through spending cuts alone.  — 804₁

- <u>Debt talks rain on Obama 50<sup>th</sup> birthday parade</u> — 802₂

WASHINGTON (Reuters) — Rancorous negations with congressional Republicans over how best to deal with the U.S. budget deficit may keep President Obama away from his own 50<sup>th</sup> birthday party in Chicago next month. — 804₂

- <u>Factbox: How the Obama/Boehner debt talks unraveled</u> — 802₃

WASHINGTON (Reuters) — President Barack Obama and House Speaker John Boehner had agreed on the rough outlines of a far-reaching budget deal that would allow the United States to avert an imminent default before Boehner broke off talks on Friday. — 804₃

FIG. 8

SYSTEM AND METHOD FOR RECOMMENDING CONTENT BASED ON SEARCH HISTORY AND TRENDING TOPICS

BACKGROUND OF THE INVENTION

Field of the Invention

The present invention generally relates to systems and methods for assisting a user in obtaining information associated with trending topics from one or more real time content sources that is of interest to the user.

Background

Publishers of Web content (and particularly aggregators of Web content such as Yahoo!, AOL, news sites, etc.) often provide content to users via a Web portal. A Web portal may comprise a Web site or Web page that offers a broad array of resources and services, such as e-mail, forums, search engines, news, weather information, stock quotes, etc. As such, it has become very common for users to designate a Web portal as their home page.

Publishers and/or aggregators of Web content often have a vested interest in delivering content to their users that the users are particularly interested in. For example, the more time a user spends on a publishers and/or aggregators Web portal, the more money the publisher/aggregator may make due to increased ad revenue. Thus, publishers/aggregators are often driven to provide relevant content to a user in hopes that the user will spend more time on the Web portal.

One type of content that users may have an interest in receiving is time-sensitive information about a particular topic (e.g., breaking news, current events, or the like). Such users may also be interested in receiving content regarding topics relevant to the user that are also currently becoming popular with others. Such topics may be referred to herein as "trending" topics. However, publisher and/or aggregator web sites, such as Web portals, typically provide trending topics as they relate to the behavior of other users of the web, and not the user himself. As a result, the user may fail to receive trending content that is relevant to the user. This may be frustrating to the user. Furthermore, the failure to retrieve desired information on behalf of the user can lead to a decline in the amount of time spent on the publishers and/or aggregators website, and therefore result in a decrease in ad revenue.

BRIEF SUMMARY OF THE INVENTION

Various approaches are described herein for, among other things, identifying and recommending trending content to a user that is based on a search history of the user, such as but not limited to a search history associated with a search engine. The recommended content is intended to provide the user with content about topics that are currently becoming popular with others and that are relevant to the user.

For example, a method for providing content associated with trending topics relevant to a user is described herein. In accordance with the method, a search history of the user is obtained. Using the search history, one or more interests of the user are determined. A database that includes one or more trending topics is also accessed. It is then determined whether a match exists between the one or more interests of the user determined from the user's search history and the one or more of the trending topics stored within the database. In response to determining that a match exists, content associated with the one or more trending topics matched with the determined one or more interests of the user is retrieved and delivered to the user.

A system for providing content associated with trending topics relevant to a user is also described herein. The system includes an interest detection module and a content retriever module. The interest detection module is configured to identify topics trending in one or more real-time content sources that are relevant to a user. The real-time content source(s) may include, for example, a source of microblog posts or other user-generated data, a news feed, or the like. The topics trending that are relevant to the user are identified by comparing a search history of the user with one or more trending topics stored in a database. The content retriever module is configured to return one or more documents to the user in response to identifying the one or more topics trending that are relevant to the user.

A computer program product is also described herein. The computer program product comprises a computer-readable storage medium having computer program logic recorded thereon for enabling a processing unit to provide content associated with trending topics relevant to a user. The computer program logic comprises first means, second means, third means and fourth means. The first means are for enabling the processing unit to receive a search history. The second means are for enabling the processing unit to match contents of the search history to one or more trending topics stored within a database, the trending topics being identified based on an analysis of content of one or more real-time content sources. The third means are for enabling the processing unit to retrieve one or more documents that are relevant to the user based on the matched one or more trending topics. The fourth means are for enabling the processing unit to return the retrieved one or more documents to the user.

By identifying and recommending trending content relevant to the user, embodiments of the present invention can assist the user in obtaining information about topics related to his interests that are also currently becoming popular with others. By helping the user obtain access to such relevant trending topic information, embodiments of the present invention can improve the experience of the user using a web site associated with a publisher and/or aggregator of web content (e.g., a Web portal). Furthermore, by enabling users of a Web portal to obtain such relevant trending topic information, embodiments of the present invention can improve key metrics associated with the Web portal, such as page views, click-through rates, and the like.

Further features and advantages of the disclosed technologies, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIG. 8 shows a home page of a user in which relevant trending content determined in accordance with the techniques described herein may be presented to a user.

Figure 1:
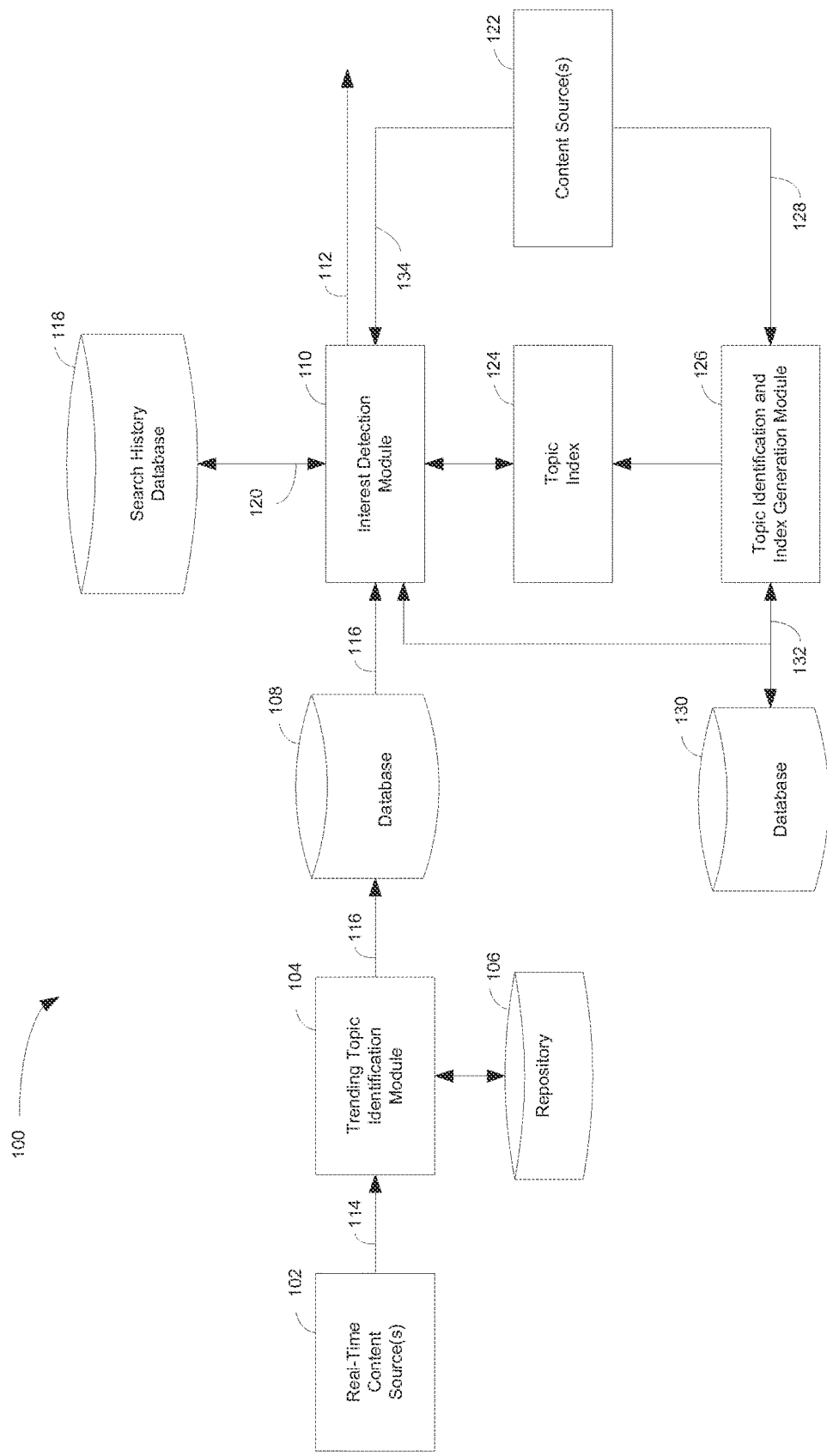
FIG. 1 is a block diagram of an example system for identifying and recommending trending content based on a search history of a user in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

Various approaches are described herein for, among other things, identifying and recommending trending content based on a user's search history, such as but not limited to a search history associated with a search engine. The trending content relevant to the user is intended to assist a user in accessing information about topics that are of interest to the user and that are also currently becoming popular with others.

By identifying and recommending trending content based on a user's search history, embodiments of the present invention can automatically provide the user of a Web portal with information about topics of interest to the user that are currently becoming popular with others without having the user submit a search query or perform some other action to find such content. By helping the user obtain access to such relevant trending content, embodiments of the present invention can improve an online experience of the user. Furthermore, by enabling users of Web portals to obtain such trending topic information, embodiments of the present invention can improve key metrics associated with the Web portal, such as page views, click-through rates, and the like.

II. Example System for Identifying and Recommending Trending Content Relevant to a User FIG. 1 is a block diagram of an example system 100 for identifying and recommending trending content based on a search history of a user in accordance with an embodiment. System 100 may be implemented, for example, in a networked computing environment. For example, system 100 may be implemented in a networked computing environment that operates to support a Web site associated with a publisher and/or aggregator of Web content, such as a Web portal that provides one or more services, including, but not limited to e-mail, forums, search engines, news, weather information, stock quotes, etc. However, this is only one example and is not intended to be limiting. Among other elements, system 100 includes a trending topic identification module 104, an interest detection module 110, a topic identification and index generation module 126, and a topic index 124.

As shown in FIG. 1, trending topic identification module 104 is configured to receive real-time content 114 from one or more real-time content sources 102. As used herein, the term "real-time content source" is intended to broadly encompass any data source that publishes or otherwise generates new information over time, and the term "real-time content" is intended to encompass any information published or otherwise generated by such a data source. Examples of real-time content 114 include, but are not limited to, user-generated content such as microblog posts (e.g., Twitter® posts), social networking messages (e.g., Facebook® messages), and/or the like. In an embodiment, real-time content 114 produced by real-time content source(s) 102 is received by trending topic identification module 104 as soon as it is generated or very shortly thereafter in order to ensure that trending topics can be determined in a timely fashion. Thus, in an embodiment, trending topic identification module 104 obtains time-sensitive information about current events from real-time content source(s) 102.

In an embodiment, trending topic identification module 104 receives real-time content 114 from a real-time content source 102 as a series of documents or other discrete information entities. A document may comprise, for example, and without limitation, a single microblog post, a single social networking message, and/or the like. Each document may thus include text. Such real-time content is received in electronic form.

Trending topic identification module 104 may store received documents, metrics calculated and assigned to such documents and text entities included therein, and/or other information in a repository 106 that is communicatively connected to trending topic identification module 104. Repository 106 is intended to broadly represent any system or device capable of storing electronic information. In an embodiment in which trending topic identification module 104 receives large amounts of real-time content 114 from real-time content source(s) 102, repository 106 may comprise a distributed storage system, such as a cloud-based storage system. Of course, other suitable storage systems or devices may be used.

As will be described in more detail herein, trending topic identification module 104 is configured to analyze real-time content 114 received from real-time content source(s) 102 to identify a number of trending topics as well as to identify other information associated therewith. Such other information may include a list of concepts and/or named entities derived from real-time content 114 and associated probabilities that each such concept and/or named entity is related to one of the trending topics. The identified trending topics and information associated therewith is then stored in a database 108 for subsequent use by interest detection module 110. In an embodiment, trending topic identification module 104 stores the identified trending topics and information associated therewith in database 108 in the form of a data structure 116. Trending topic identification module 104 may be configured to perform the above-mentioned operations on a periodic basis so as to periodically provide a new data structure 116 for use by interest detection module 110. This advantageously ensures that interest detection module 110 is working with a fresh list of trending topics and associated information. Further information concerning the structure, function and operation of trending topic identification module will be provided herein in reference to FIGS. 2 and 3.

Database 108 is intended to broadly represent any organized collection of data stored in any suitable storage system or device. In an embodiment, system 100 also includes a database server (not shown in FIG. 1) that facilitates access to database 108 on behalf of a client, wherein a client may include, for example, trending topic identification module 104 and interest detection module 110. However, this is only an example and is not intended to be limiting. Persons skilled in the relevant art(s) will readily appreciate that other means for accessing data in database 108 may be used.

As further shown in FIG. 1, topic identification and index generation module 126 is configured to receive content 128 from content source(s) 122. The content stored in content source(s) 122 may include real-time content, such as microblog posts (e.g., Twitter® posts), social networking messages (e.g., Facebook® messages), and/or the like. Content source(s) 122 may further include articles published by news organizations, information from current events Web sites, and/or the like. In an embodiment, content 128 produced by content source(s) 122 is received by trending topic identification and index generation module 126 as soon as it is generated or very shortly thereafter in order to ensure that topic index 124 (described below) is updated in a timely fashion.

In an embodiment, topic identification and index generation module 126 receives content 128 from content source(s) 122 as a series of documents or other discrete information entities. A document may comprise, for example, and without limitation, a single microblog post, a single social networking message, a single news article, and/or the like. Each document may thus include text. Such content 128 is received in electronic form.

As will be described in more detail herein, topic identification and index generation module 126 is configured to analyze content 128 received from content source(s) 122 to identify a number of topics and to build topic index 124 in accordance to the topics identified. Topic identification and index generation module 126 is also configured to identify other information associated therewith. Such other information may include a list of concepts and/or named entities derived from content 128 and associated probabilities that each such concept and/or named entity is related to one of the topics. The identified topics and information associated therewith is used to build topic index 124.

In an embodiment, topic identification and index generation module 126 stores the identified topics and information associated therewith in database 130 in the form of a data structure 132. Topic identification and index generation module 126 may be configured to perform the above-mentioned operations on a periodic basis so as to periodically provide a new data structure 132 for use by interest detection module 110. This advantageously ensures that interest detection module 110 is working with a fresh list of topics and associated information derived from content 128. Further information concerning the structure, function and operation of topic identification and index generation module 126 will be provided herein in reference to FIGS. 4 and 5.

As further shown in FIG. 1, topic index 124 is configured to receive identified topics and associated information therewith from topic identification and index generation module 126. Using the identified topics and the associated information, topic identification and index generation module 126 builds topic index 124, which contains a mapping of concepts and/or named entities to their locations in a set of documents (i.e., the content located in content source(s) 122). Interest detection module 110 retrieves the documents by providing topic index 124 with concepts and/or named entities associated with trending topics relevant to a user. In response, locations of where to find the content are returned to interest detection module 110 from the topic index 124.

In one embodiment, topic index 124 may be configured to be an inverted index. An inverted index is a data structure that contains terms (i.e. concepts and/or named entities) found in documents stored in content source(s) 122. For each concept and/or named entity (or group of concepts and/or named entities), the inverted index also stores a listing of documents that contain the concepts and/or named entities. For example, suppose a first document (D1) contains the following text: "The GDP increased two percent this quarter." Further suppose that a second document (D2) contains the following text: "The spring economic slowdown continued to spring downwards this quarter." In this example, an inverted index for these two documents would be represented as the following:

two→[D1]
continued→[D2]
downwards→[D2]
economic→[D2]
GDP→[D1]
increased→[D1]
percent→[D1]
quarter→[D1]→[D2]
slowdown→[D2]
spring→[D2]
the→[D1]→[D2]
this→[D1]→[D2]
to→[D2]

As shown, the terms "continued," "economic," "slowdown," "spring," and "to" appear in only the second document (D2), the terms "GDP," "increased," and "percent,"

and "two" appear in only the first document (D1), and the terms "quarter," "the," and "this" appear in both documents (D1) and (D2).

The index of terms may be populated with concepts and/or named entities derived from topic identification and index generation module 126. The location of documents may be references (e.g., a document identification number) associated with the documents stored in content source(s) 122. Further information concerning the structure, function and operation of topic index 124 will be provided herein in reference to FIGS. 6 and 7.

As further shown in FIG. 1, interest detection module 110 obtains a search history 120 for a user of a search engine associated with a Web portal from search history database 118 and receives trending topics as determined by trending topic identification module 104 via data structure 116. Using search history 120 and the trending topics, interest detection module 110 determines trending topics that are relevant to the user and retrieves relevant trending content 134 for the user. Once the relevant trending content 134 is retrieved, content 134 is presented to the user via output 112. Output 112 may include a personalized Web page for the user, an outgoing SMS message, an e-mail message, or other type of interpersonal communication relative to an electronic system/device.

Interest detection module 110 may retrieve search history 120 for a particular user from search history database 118 in response to a user logging into a web site associated with a publisher and/or aggregator of web content (e.g. a Web portal). Upon logging in, interest detection module 110 retrieves the user's search history using a unique identifier associated with the user. In one embodiment, the unique identifier is a user ID used for logging into the Web portal. Search history 120 may include a history of past search queries made by the user. Search history 120 may also include a history of documents returned to and/or accessed by the user as a result of the past search queries.

In one embodiment, search history 120 retrieved from search history database 118 may be limited to a fixed time interval. In a particular embodiment, the fixed time interval is the most recent 24 hours of search history. In this case, search history 120 includes a history of the documents retrieved and/or accessed and the search queries made during the last 24 hours. Any history of the documents accessed and/or retrieved and the search queries made during a time period greater than 24 hours may be discarded. This advantageously ensures that interest detection module 110 is working with the most recent search history. It is noted that other time intervals may be used. In certain embodiments, the fixed time interval is exposed as a configurable parameter to a system administrator, thereby allowing the parameter to be tuned to achieve desired performance.

As will be described in more detail herein, in one embodiment, after determining that interests of a user are trending, interest detection module 110 retrieves the relevant trending content 134 from content source(s) 122 and sorts retrieved content 134 so that the most relevant content is provided to the user first. Further information concerning the structure, function and operation of interest detection module 110 will be provided herein in reference to FIGS. 6 and 7.

Depending upon the implementation, each of trending topic identification module 104, interest detection module 110, trending topic identification and index generation module 126 and topic index 124 may be implemented using a single computer or multiple interconnected computers. For example, where the volume of real-time content 114 is large, the operations of trending topic identification module 110 may be performed in a distributed fashion across a plurality of interconnected computers. Likewise, where the volume of content source(s) 122 is large, the operations of trending topic identification and index generation module 126 may be performed and topic index 124 may be stored in a distributed fashion across a plurality of interconnected computers. Example implementations of trending topic identification module 104, interest detection module 110, trending topic identification and index generation module 126 and topic index 124 will now be described.

III. Example Trending Topic Identification Module and Method

Figure 2:
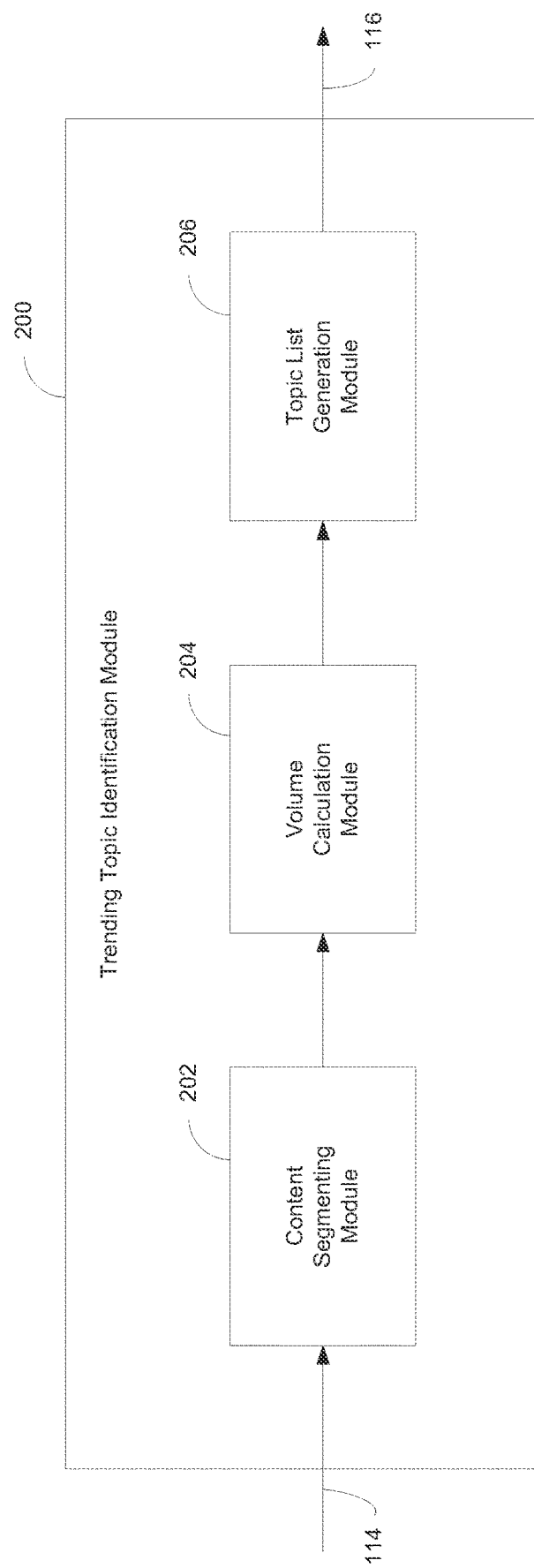
FIG. 2 is a block diagram of a trending topic identification module in accordance with an embodiment.

FIG. 2 is a block diagram of an example trending topic identification module 200 in accordance with an embodiment. Trending topic identification module 200 may comprise one implementation of trending topic identification module 104 described above in reference to FIG. 1. As such, trending topic identification module 104 is configured to analyze real-time content 114 received from real-time content source(s) 102 to identify a number of trending topics as well as to identify other information associated therewith. Such other information may include a list of concepts and/or named entities derived from real-time content 114 and associated probabilities that each such word or named entity is related to one of the trending topics. Trending topic identification module 200 then stores the identified trending topics and information associated therewith in database 108 for subsequent use by an interest detection module, such as interest detection module 110.

Trending topic identification module 200 is configured to operate in iterations having a fixed time interval. During each iteration, trending topic identification module 200 consumes a portion of real-time content 114 provided from real-time content source(s) 102 and processes such portion to generate a new version of data structure 116 that includes identified trending topics and information associated therewith. Trending topic identification module 200 may also store portions of real-time content 114 that were consumed during one or more previous iterations as well as analytic data generated during the processing of same in a repository connected thereto (such as repository 106 shown in FIG. 1). In an embodiment, trending topic information module 200 stores portions of real-time content 114 that were consumed during a historical time period of which the fixed time interval is a part, as well as analytic data generated during the processing of same. In a particular embodiment, the fixed time interval is one hour and the historical time period is 24 hours. However, other time intervals and historical time periods may be used. In certain embodiments, the fixed time interval and historical time period are exposed as configurable parameters to a system administrator, thereby allowing these parameters to be tuned to achieve desired performance.

As shown in FIG. 2, example trending topic identification module 200 includes a content segmenting module 202, a volume calculation module 204 and a topic list generation module 206. As noted above, each of these components operates together to process a portion of real-time content 114 received during a fixed time interval to produce a new version of data structure 116. The manner in which each of these components operates to carry out this function will now be described.

Content segmenting module 202 receives a portion of real-time content 114 received during a fixed time interval and segments the received content into concepts and/or named entities. In an embodiment, the portion of real-time content 114 received by content segmenting module 202 comprises a plurality of documents, each of which includes text, and content segmenting module 202 operates to segment the document text into concepts and/or named entities. As used herein, the term "named entity" refers to phrases that contain the names of persons, organizations, locations, times and quantities. The term may also encompass other rigid designators commonly recognized as named entities by persons skilled in the art of named entity recognition (NER). As part of the segmenting process, content segmenting module 202 may normalize document text, performing functions such as stemming and removing words that do not provide information (e.g., "the," "a," or the like). By way of example, content segmenting module 202 may receive a document that includes the text "Derek Jeter signing new contract with Yankees" and segment the text into the concepts "sign," "new" and "contract" and the named entities "Derek Jeter" and "Yankees." Content segmenting module 202 may store the concepts and/or named entities and an identification of the document(s) they are associated therewith in a repository (e.g., repository 106).

Volume calculation module 204 processes the concepts and/or named entities produced by content segmenting module 202 for the current time interval to calculate a volume for each of a predefined number of topics for the current interval. Volume calculation module 204 performs this function, in part, by applying a probabilistic topic model to the concepts and/or named entities produced by content segmenting module 202 for the current time interval. The probabilistic topic model may comprise, for example, a standard probabilistic topic model such as Latent Dirichlet Allocation (LDA) or Probabilistic Latent Semantic Analysis (PLSA). However, other suitable standard or non-standard probabilistic topic models may be used. By applying the probabilistic topic model in this manner, volume calculation module 204 generates: (i) a probability that each word or named entity produced by content segmenting module 202 for the current time interval belongs to each one of the predefined number of topics; and (ii) a probability that each document received during the current time interval is related to each of the predefined number of topics.

As will be appreciated by persons skilled in the relevant art(s), the number of topics in the predefined number of topics determines the granularity of topical clustering that will be applied to the words, named entities and documents received during the current time interval. In one embodiment, the predefined number of topics is exposed as a configurable parameter to a system administrator, thereby allowing this parameter to be tuned to achieve a desired performance.

Volume calculation module 204 then uses the results of the application of the probabilistic topic model to calculate a volume for each of the predefined number of topics for the current time interval. In one embodiment, volume calculation module 204 performs this function by, for each of the predefined number of topics, summing the probabilities that each document received during the current time interval is related to the topic. Still other methods may be used to determine a volume for each of the predefined number of topics for the current time interval.

Once volumes have been calculated for each of the predefined number of topics for the current time interval by volume calculation module 204, topic list generation module 206 compares the current interval volume to a mean volume calculated over a historical time period for each of the predefined number of topics to calculate a deviation for each of the predefined number of topics. The calculated deviation for each of the predefined number of topics comprises the trending score for the topic. In one embodiment, topic list generation module 206 determines the mean volume for each of the predefined number of topics over the historical time period by, for each of the predefined number of topics, taking an average of the determined volumes for that topic over all of the time intervals within the historical time period. Still other methods may be used to determine a mean volume for each of the predefined number of topics over the historical time period.

The foregoing presents only one particular approach for determining a trending score associated with each topic in the predefined number of topics. It is noted that in alternate embodiments the trending score for each topic may be determined in ways that do not require calculation of a mean volume for each topic. For example, trending scores may be obtained using any of a variety of well-known mathematical methods for identifying the peak and/or slope of a volume graph associated with each topic, or for identifying other indicators from which trends can be identified. Furthermore, methods like noise smoothing can also be applied to improve accuracy.

Topic list generation module 206 then compares the trending score obtained for each of the predefined number of topics (i.e., the deviation measure obtained for each of the predefined number of topics) to a threshold value. This threshold value may be fixed during development time, configured by a system administrator, or adaptively determined by topic list generation module 206 based on any of a variety of factors. For example, if a comparison of trending scores to a threshold leads to a less than desirable number of trending topics, topic list generation module 206 may adjust the threshold score to generate more trending topics.

If topic list generation module 206 determines that a topic in the predefined number of topics has a trending score that exceeds the threshold value, then topic list generation module 206 will add the topic to a list of trending topics included in data structure 116. Topic list generation module also includes the concepts and/or named entities associated with these trending topics in data structure 116 along with the probabilities that such concepts and/or named entities related to each of the trending topics. Topic list generation module 206 then stores data structure 116 in a database, such as database 108 of FIG. 1, for subsequent use by an interest detection module, such as interest detection module 110 of FIG. 1.

Figure 3:
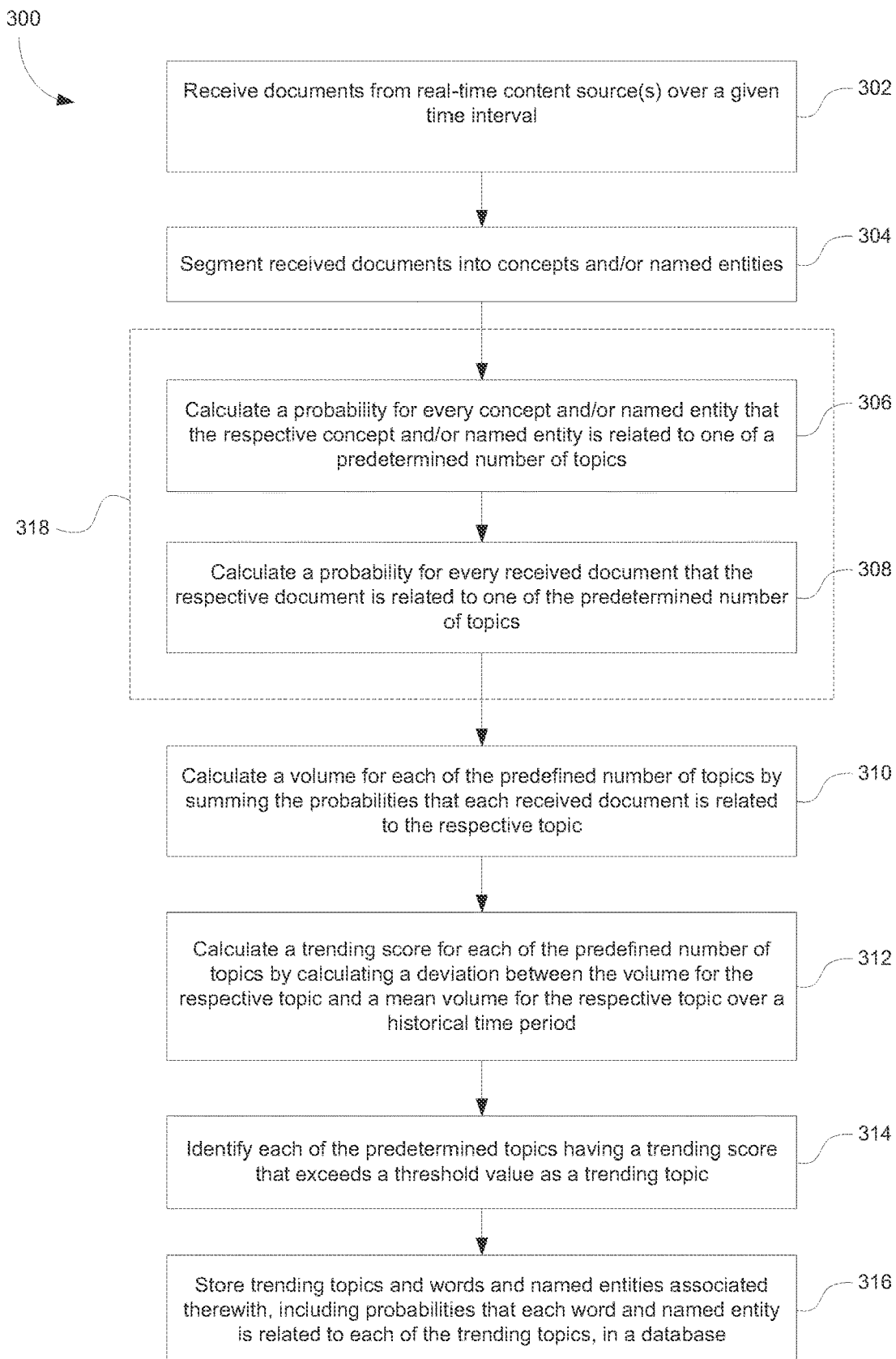
FIG. 3 depicts a flowchart of a method for identifying trending topics based on content received from one or more real-time data sources in accordance with an embodiment.

FIG. 3 depicts a flowchart 300 of a method for identifying trending topics based on content received from one or more real-time data sources in accordance with an embodiment. The method of flowchart 300 may be implemented by trending topic generation module 104 as described above in reference to FIG. 1 or trending topic generation module 200 as described above in reference to FIG. 2. However, the method is not limited to those implementations and may be performed by other entities entirely. Further structural and operational embodiments will be apparent to persons skilled in the relevant art(s) based on the following description of flowchart 300.

As shown in FIG. 3, the method of flowchart 300 begins at step 302 in which documents are received from one or more real-time content sources over a given time interval.

At step 304, the received documents are segmented into concepts and/or named entities.

At step 306, a probability is calculated for every concept and/or named entity that the respective concept and/or named entity is related to one of a predetermined number of topics.

At step 308, a probability is calculated for every received document that the respective document is related to one of the predetermined number of topics.

As discussed above, in one embodiment, step 306 and step 308 are performed as part of the application of probabilistic topic model to the concepts and/or named entities produced during step 304. For example, step 306 and step 308 may be performed as a result of the processing of the concepts and/or named entities produced during step 304 by an LDA topic generator. In accordance with such an embodiment, the operations of step 306 and step 308 may be thought of as being part of a single step 318 as shown in FIG. 3.

At step 310, a volume is determined for each of the predetermined number of topics by summing the calculated probabilities that each received document is related to the respective topic.

At step 312, a trending score is calculated for each of the predefined number of topics by calculating a deviation between the volume for the respective topic determined during step 310 and a mean volume for the respective topic over a historical time period.

At step 314, each of the predetermined topics having a trending score that exceeds a threshold value is identified as a trending topic.

At step 316, the trending topics identified during step 314 and the concepts and/or named entities associated therewith, including probabilities that each concept and/or named entity is related to each of the trending topics, is stored in a database. Such database may be used by an interest detection module, such as interest detection module 110 of FIG. 1.

IV. Example Topic Identification and Index Generation Module and Method

Figure 4:
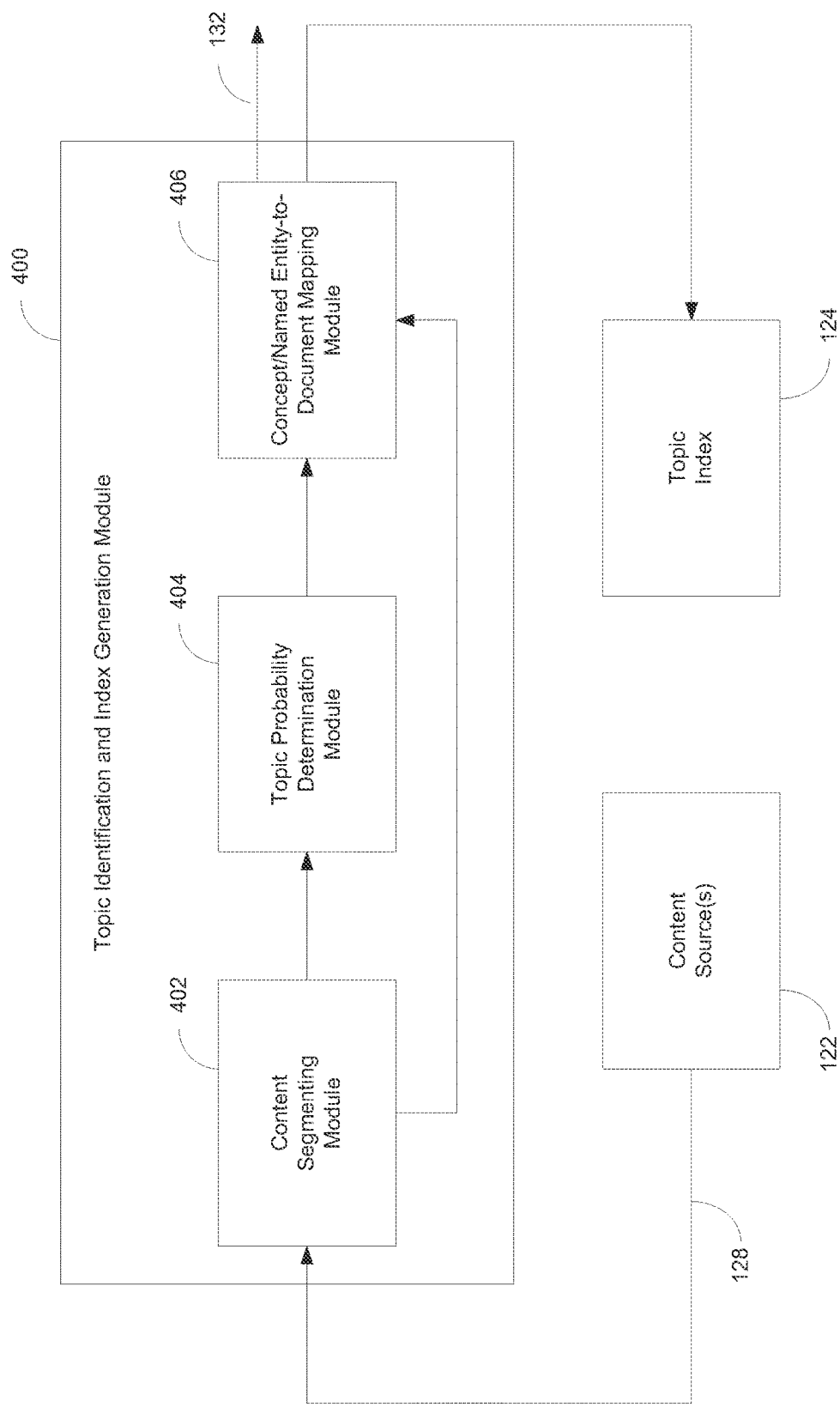
FIG. 4 is a block diagram of a topic identification module and index generation module in accordance with an embodiment.

FIG. 4 is a block diagram of an example topic identification and index generation module 400 in accordance with an embodiment. Topic identification and index generation module 400 may comprise one implementation of topic identification and index generation module 126 described above in reference to FIG. 1. As such, topic identification and index generation module 400 may be configured to analyze content 128 received from content source(s) 122 to identify a number of topics as well as to identify other information associated therewith and subsequently build topic index 124. Such other information may include a list of concepts and/or named entities derived from content 128 and associated probabilities that each such concept and/or named entity is related to one of the topics. Topic identification and index generation module 400 then stores the identified trending topics and information associated therewith in database 130 for subsequent use by an interest detection module, such as interest detection module 110.

Topic identification and index generation module 400 is configured to operate in iterations having a fixed time interval. During each iteration, topic identification and index generation module 400 consumes a portion of content 128 provided from content source(s) 122 and processes such portion to generate a new version of data structure 132 that includes identified topics and information associated therewith. In a particular embodiment, the fixed time interval is one hour. However, other time intervals may be used. In certain embodiments, the fixed time interval is exposed as a configurable parameter to a system administrator, thereby allowing this parameter to be tuned to achieve desired performance.

As shown in FIG. 4, example topic identification and index generation module 400 includes a content segmenting module 404, a topic probability determination module 404 and a concept/named entity-to-document mapping module 406. Each of these components operates together to process a portion of content 128 received during a fixed time interval to produce a new version of data structure 132. The manner in which each of these components operates to carry out this function will now be described.

Content segmenting module 402 receives a portion of content 128 received during a fixed time interval and segments the received content into concepts and/or named entities. In an embodiment, the portion of content 128 received by content segmenting module 402 comprises a plurality of documents, each of which includes text, and content segmenting module 402 operates to segment the document text into concepts and/or named entities. As part of the segmenting process, content segmenting module 402 may normalize document text, performing functions such as stemming and removing words that do not provide information (e.g., "the," "a," or the like). Content segmenting module 402 may store the concepts and/or named entities and an identification of the document(s) they are associated therewith in a repository or database (e.g., database 130).

Topic probability determination module 404 processes the concepts and/or named entities produced by content segmenting module 402 for the current time interval to determine the probability that each concept and/or named entity belongs to a particular topic for the current interval. Topic probability determination module 404 performs this function, in part, by applying a probabilistic topic model to the concepts and/or named entities produced by content segmenting module 402 for the current time interval. The probabilistic topic model may comprise, for example, a standard probabilistic topic model such as Latent Dirichlet Allocation (LDA) or Probabilistic Latent Semantic Analysis (PLSA). However, other suitable standard or non-standard probabilistic topic models may be used. By applying the probabilistic topic model in this manner, topic probability determination module 404 generates: (i) a probability that each word or named entity produced by content segmenting module 402 for the current time interval belongs to each one of the predefined number of topics; and (ii) a probability that each document received during the current time interval is related to each of the predefined number of topics.

As will be appreciated by persons skilled in the relevant art(s), the number of topics in the predefined number of topics determines the granularity of topical clustering that will be applied to the words, named entities and documents received during the current time interval. In one embodiment, the predefined number of topics is exposed as a configurable parameter to a system administrator, thereby allowing this parameter to be tuned to achieve a desired performance.

Concept/named entity-to-document mapping module 406 processes the probabilities that that each word or named entity belongs to each one of the predefined number of topics and the probabilities that each document received during the current time interval is related to each of the predefined number of topics and calculates a probability for each concept and/or named entity that the respective concept and/or named entity belongs to each of the documents (i.e., content 128) received from content source(s) 122.

In one embodiment, concept/named entity-to-document mapping module 406 may calculate the probability that a concept and/or named entity belongs to a particular document (or documents) by multiplying the probability that a particular concept and/or named entity belongs to a particular predefined topic by the probability that the particular document (or documents) belongs to the same predefined topic. The resulting probability may be compared to a threshold value. The concepts and/or named entities that have a resulting probability that reach or exceed the threshold value may be used to build topic index 124. For example, if concept/named entity-to-document mapping module 406 determines that the probability that a particular concept and/or named entity relates to a particular document (or documents) reaches or exceeds the threshold value, the concept/named entity-to-document module creates a mapping between that particular concept and/or named entity and document (or documents) in topic index 124. The index of terms for topic index 124 may be populated with concepts and/or named entities derived from topic identification and index generation module 126. Each concept and/or named entity may be mapped to an identification of the documents (e.g., a document identification number) associated with those concepts and/or named entities. The identification of the documents may be determined by content segmenting module 402. The concept/named entity-to-document mapping module 406 repeats this process for each of the concepts and/or named entities and documents to build the topic index 124.

It is noted that the threshold value may be fixed during development time, configured by a system administrator, or adaptively determined by concept/named entity-to-document mapping module 406 based on any of a variety of factors. For example, if a comparison of scores to the threshold value leads to a less than desirable number of topics in topic index 124, concept/named entity-to-document mapping module 406 may adjust the threshold score to generate more trending topics.

Figure 5:
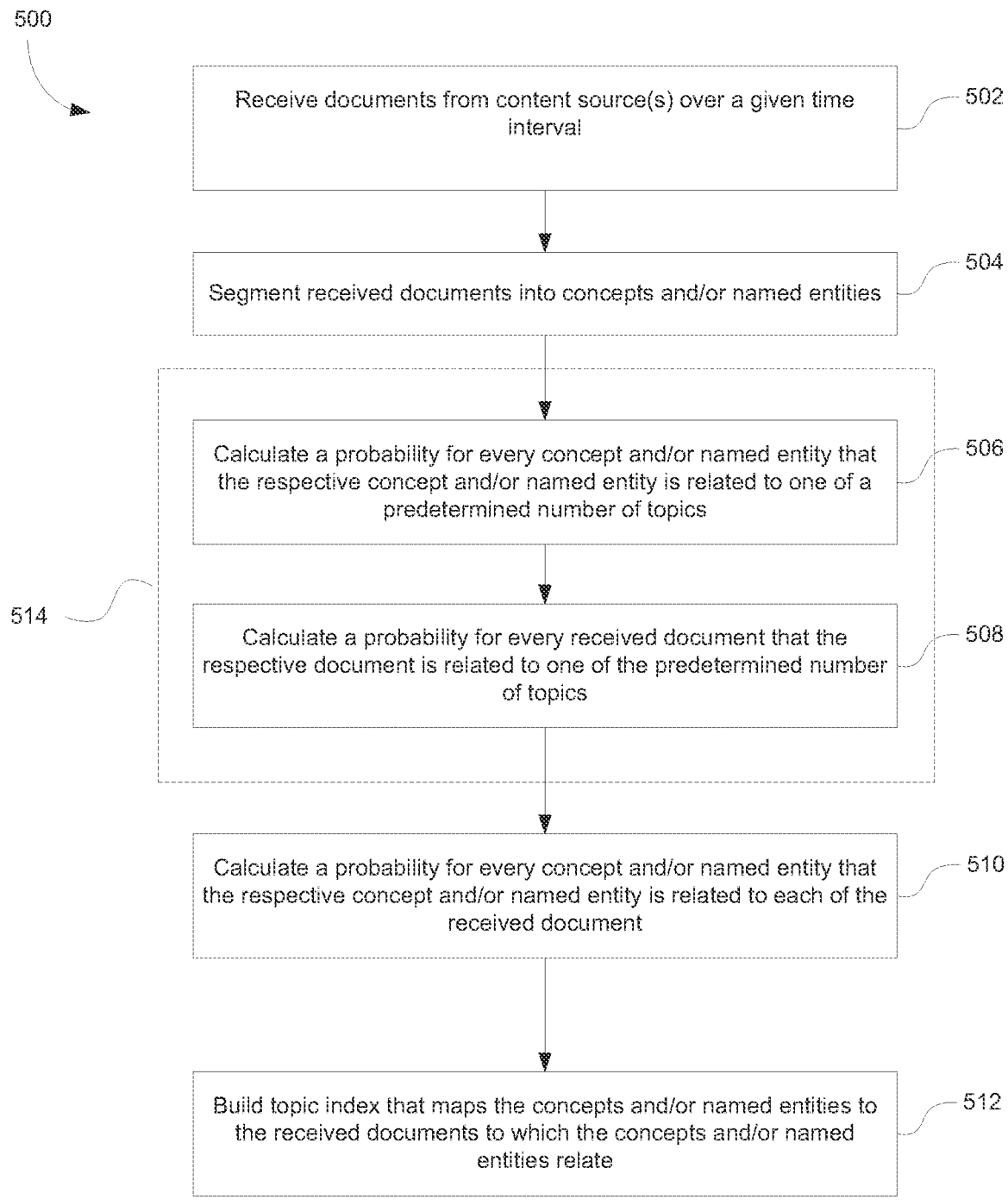
FIG. 5 depicts a flowchart of a method for identifying topics based on content received from content source(s) and building a topic index based on the identified topics in accordance with an embodiment.

FIG. 5 depicts a flowchart 500 of a method for identifying topics based on content received from content source(s) and building a topic index based on the identified topics in accordance with an embodiment. The method of flowchart 500 may be implemented by topic identification and index generation module 126 as described above in reference to FIG. 1 or topic identification and index generation module 400 as described above in reference to FIG. 4. However, the method is not limited to those implementations and may be performed by other entities entirely. Further structural and operational embodiments will be apparent to persons skilled in the relevant art(s) based on the following description of flowchart 500.

As shown in FIG. 5, the method of flowchart 500 begins at step 502 in which documents are received from one or more content sources over a given time interval.

At step 504, the received documents are segmented into concepts and/or named entities.

At step 506, a probability is calculated for every concept and/or named entity that the respective concept and/or named entity is related to one of a predetermined number of topics.

At step 508, a probability is calculated for every received document that the respective document is related to one of the predetermined number of topics.

As discussed above, in one embodiment, step 506 and step 508 are performed as part of the application of probabilistic topic model to the concepts and/or named entities produced during step 504. For example, step 506 and step 508 may be performed as a result of the processing of the concepts and/or named entities produced during step 504 by an LDA topic generator. In accordance with such an embodiment, the operations of step 506 and step 508 may be thought of as being part of a single step 514 as shown in FIG. 5.

At step 510, a probability is calculated for every concept and/or named entity that the respective concept and/or named entity is related to each of the documents received from the one or more content sources. In accordance with one embodiment, this probability may be calculated using the probabilities calculated in steps 506 and 508.

At step 512, a topic index is built that maps the concepts and/or named entities to each of the received documents to which the concepts and/or named entities relate.

V. Example Interest Detection Module and Method

Figure 6:
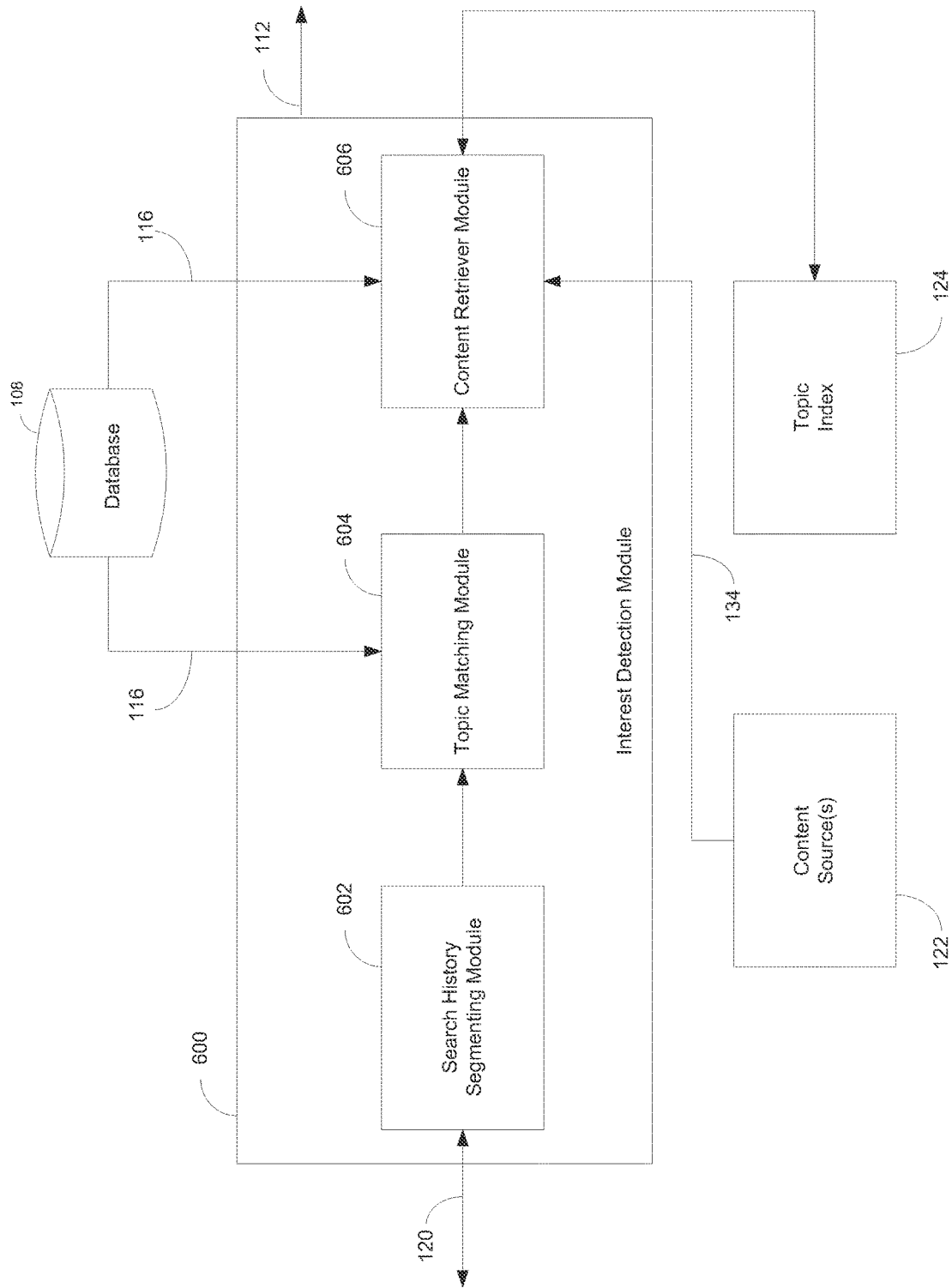
FIG. 6 is a block diagram of an interest detection module in accordance with an embodiment.

FIG. 6 is a block diagram of an example interest detection module 600 in accordance with an embodiment. Interest detection module 600 may comprise one implementation of interest detection module 110 described above in reference to FIG. 1. Interest detection module 600 may be configured to operate when a user logs into a web site associated with a publisher and/or aggregator of web content (e.g., a Web portal). Upon detection of a user logging in, interest detection module 600 may be configured to receive the user's search history 120 and receive concepts and/or named entities associated with one or more trending topics in data structure 116 stored in data structure 108. Using search history 120 and the concepts and/or named entities associated with one or more trending topics, interest detection module 600 determines trending topics that are relevant to the user and retrieves relevant trending content 134 to the user. Once the relevant trending content 134 is retrieved, the content 134 is presented to the user via output 112. As shown in FIG. 6, interest detection module 600 includes a search history segmenting module 602, a topic matching module 604 and a content retriever module 606. These elements of interest detection module 600 are described as follows.

Search history segmenting module 602 is configured to receive search history 120 and to segment search history 120 into concepts and/or named entities. The segmenting process may be similar to that used by content segmenting module 202 as described above in reference to FIG. 2 and content segment segmenting module 402 described above in reference to FIG. 4. As part of the segmenting process, search history segmenting module 602 may normalize the text of past queries made and/or documents accessed and/or retrieved, performing functions such as stemming and removing words that do not provide information (e.g., "the," "a," or the like).

Search history segmenting module 602 may also be configured to determine a user interest level for each of the concepts and/or named entities derived from search history 120. In accordance with one embodiment, a user's interest level for a particular concept and/or named entity may be determined by the frequency with which the particular concept and/or named entity appears in the documents included in the user's search history 120 relative to the frequencies with which all the concepts and/or named entities included in the documents in the user's search history 120. For example, if the named entity "Barack Obama" appears in the documents included in the user's search history 120 more than the named entity "Joe Biden," then search history segmenting module 602 may determine that the user has a higher interest level in "Barack Obama" than in "Joe Biden."

In another embodiment, a user's interest level for a particular concept and/or named entity may be determined by the frequency with which the particular concept and/or named entity appears in the documents located in the user's search history 120 relative to the frequency that the particular concept and/or named entity appears in a corpus of all documents that are accessible by all users of the Web portal. For example, suppose a user submits a search query for the named entity "Barack Obama" and accesses 15 documents, which were returned as a result of the user's search query. Further suppose that out of 1000 documents that are accessible by all users of the Web portal, 20 of those documents contain the named entity "Barack Obama." In this case, the user's search history may only indicate that 15 documents that were accessed contained the named entity "Barack Obama," which may be relatively low with respect to a number of documents actually accessed by the user. However, because only 20 documents were possibly accessible with regard to the named entity "Barack Obama," search history segmentation module 602 may determine that the user interest level of "Barack Obama" is high because a majority of documents that relate to "Barack Obama" were accessed.

Regardless of the technique used to determine the user interest level for a particular concept and/or named entity, once the user interest level is determined, the user interest level for the particular concept and/or named entity may be weighted by a respective age of the queries and/or documents from search history 120 used to derive the concepts and/or named entities. For example, a user's interest level for a particular concept and/or named entity may be lowered as the age of the queries and/or documents used to derive the particular concept and/or named entity gets older.

Topic matching module 604 is configured to identify one or more trending topics from among the trending topics stored in data structure 116 that match (i.e., that are most related to) the concepts and/or named entities of search history 120 identified by search history segmenting module 602. To perform this function, topic matching module 604 accesses data structure 116 in database 108 as shown in FIG. 6. In particular, topic matching module 604 identifies concepts and/or named entities of search history 120 that also appear in data structure 116. Then, for each of the identified concept and/or named entities, topic matching module 604 sums the probabilities associated with each of the trending topics and the identified concept and/or named entity (as determined by volume calculation module 204). Thereafter, the topic matching module 604 weights the summed probability with the user interest level associated for that concept and named entity (as determined by search history segmenting module 602), thereby generating a relevance value for the identified concept and named entity.

Topic matching module 604 then sorts the identified concepts and/or named entities by the relevance value calculated for each such concept and/or named entity in descending order. Topic matching module 604 then compares the relevance values for each concept and/or named entity to a threshold value and discards any identified concepts and/or named entities having relevance values that do not exceed the threshold value. The identified concepts and/or named entities having relevance values that do exceed the threshold value are deemed matching trending topics. In one embodiment, if topic matching module 604 does not identify any matching trending topics, then content retriever module 604 will not retrieve any content 134.

Content retriever module 606 is configured to operate when one or more matching trending topics are identified by topic matching module 606. For each of the matching trending topics, content retriever module 606 uses the identified concepts and/or named entities associated with the matching trending topics and accesses topic index 124 to locate and retrieve content 134 relevant to the user.

Upon retrieving content 134, content retriever module 606 sorts such content by the probabilities that such content relates to the matching trending topic (as determined by topic probability determination module 404) in descending order to provide the top-most sorted content to the user. In one embodiment, before sorting content 134, content retriever module 606 may be further configured to weight the probabilities that such content relates to the matching trending topic by the relative age of such content. In doing so, older content may be filtered out before providing content 134 to the user. Content 134 may be provided to a user via a personalized Web page for the user, an outgoing SMS message, an e-mail message, or other type of interpersonal communication relative to an electronic system/device.

Figure 7:
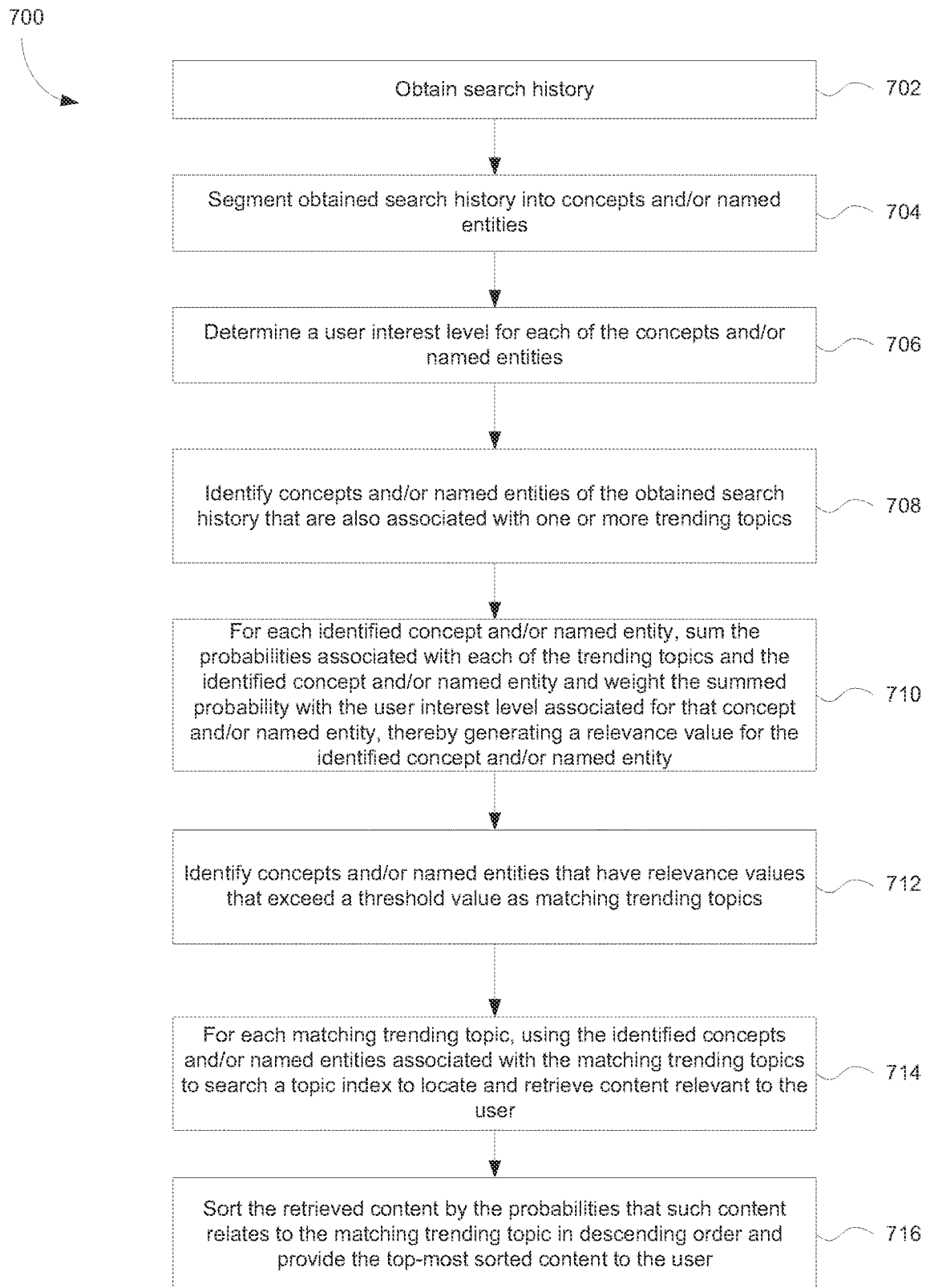
FIG. 7 depicts a flowchart of a method for determining and retrieving trending content relevant to a user in accordance with an embodiment.

FIG. 7 depicts a flowchart 700 of a method for determining and retrieving trending content relevant to a user in accordance with an embodiment. The method of flowchart 700 may be implemented by interest detection module 110 as described above in reference to FIG. 1 or interest detection module 600 as described above in reference to FIG. 6. However, the method is not limited to those implementations and may be performed by other entities entirely. Further structural and operational embodiments will be apparent to persons skilled in the relevant art(s) based on the following description of flowchart 700.

As shown in FIG. 7, flowchart 700 begins at step 702 in which a search history is obtained. The search history may be obtained in response to a user logging into a web site associated with a publisher and/or aggregator of web content (e.g., a Web portal). Upon logging into the Web portal, interest detection module 600 accesses search history database using a unique identifier (e.g., a user ID) that a user uses to log in to the Web portal and retrieves a search history associated with that user.

At step 704, the obtained search history is segmented into concepts and/or named entities.

At step 706, a user interest level is determined for each of the concepts and/or named entities.

At step 708, concepts and/or named entities of the obtained search history that are also associated with a plurality of trending topics are identified.

At step 710, for each of the identified concepts and/or named entities, the probability associated with each of the trending topics and the identified concept and named entity is summed, and the summed probability is weighted by the user interest level associated for that concept and named entity, thereby generating a relevance value for the respective trending topic At step 712, identified concepts and/or named entities that have relevance values that exceed a threshold value are identified as matching trending topics.

At step 714, for each matching trending topic, the identified concepts and/or named entities associated with the matching trending topic are used to search a topic index to locate and retrieve content relevant to the user.

At step 716, the retrieved content is sorted by the probabilities that such content relates to the matching trending topic in descending order, and the top-most sorted content is provided to the user. As previously mentioned, older content may be filtered out before providing the content to the user by weighting the probabilities that such content relates to the matching trending topic by the relative age of such content.

In certain implementations, relevant content 134 retrieved by interest detection module 110 or interest detection module 600 are presented to a user via output 112 upon logging into a web site associated with a publisher and/or aggregator of web content (e.g., a Web portal).

For example, FIG. 8 shows a home page 800 for a logged-in user of a Web portal in which trending content relevant to a user is determined in accordance with the techniques described herein may be presented to a user. As shown in FIG. 8, home page 800 includes a recommended news section 802, trending content relevant to a user $802_1$, $802_2$, and $802_3$ and abstracts $804_1$, $804_2$, and $804_3$ containing summaries for the trending content relevant to the user $802_1$, $802_2$, and $802_3$. In this case, interest detection module determined that the named entity "Barack Obama" was among the user's interests and that "Barack Obama" was also trending. As a result, trending content related to "Barack Obama" was provided to the user. In this case, trending content relevant to the user includes links to recent news articles. While not shown, trending content relevant to the user may also include microblog posts (e.g., Twitter® posts), social networking messages (e.g., Facebook® messages), and/or the like. As shown, abstracts $804_1$, $804_2$, and $804_3$ for each news article are displayed below each link for the news article. While not shown, it is appreciated that home page 800 may also display media, such as pictures, videos, etc. that are associated with the relevant trending content shown to the user.

As discussed above, however, embodiments described herein may be used in to provide trending content relevant to a user for use in contexts other than Web portals. Thus, the example provided above in reference to FIG. 8 is provided for illustration only and are not intended to be limiting.

VI. Other Example Embodiments

Trending topic identification module 104, topic identification and index generation module 126, interest detection module 110, content segmenting module 202, volume calculation module 204, topic list generation module 206, content segmenting module 402, topic probability determination module 404, concept/named entity-to-document mapping module 406, search history segmenting module 602, topic matching module 604, and/or content retriever module 606 may be implemented in hardware, software, firmware, or any combination thereof. For example, trending topic identification module 104, topic identification and index generation module 126, interest detection module 110, content segmenting module 202, volume calculation module 204, topic list generation module 206, content segmenting module 402, topic probability determination module 404, concept/named entity-to-document mapping module 406, search history segmenting module 602, topic matching module 604, and/or content retriever module 606 may be implemented as computer program code configured to be executed in one or more processors. In another example, trending topic identification module 104, topic identification and index generation module 126, interest detection module 110, content segmenting module 202, volume calculation module 204, topic list generation module 206, content segmenting module 402, topic probability determination module 404, concept/named entity-to-document mapping module 406, search history segmenting module 602, topic matching module 604, and/or content retriever module 606 may be implemented as hardware logic/electrical circuitry.

VII. Example Computer System Implementation

Figure 9:
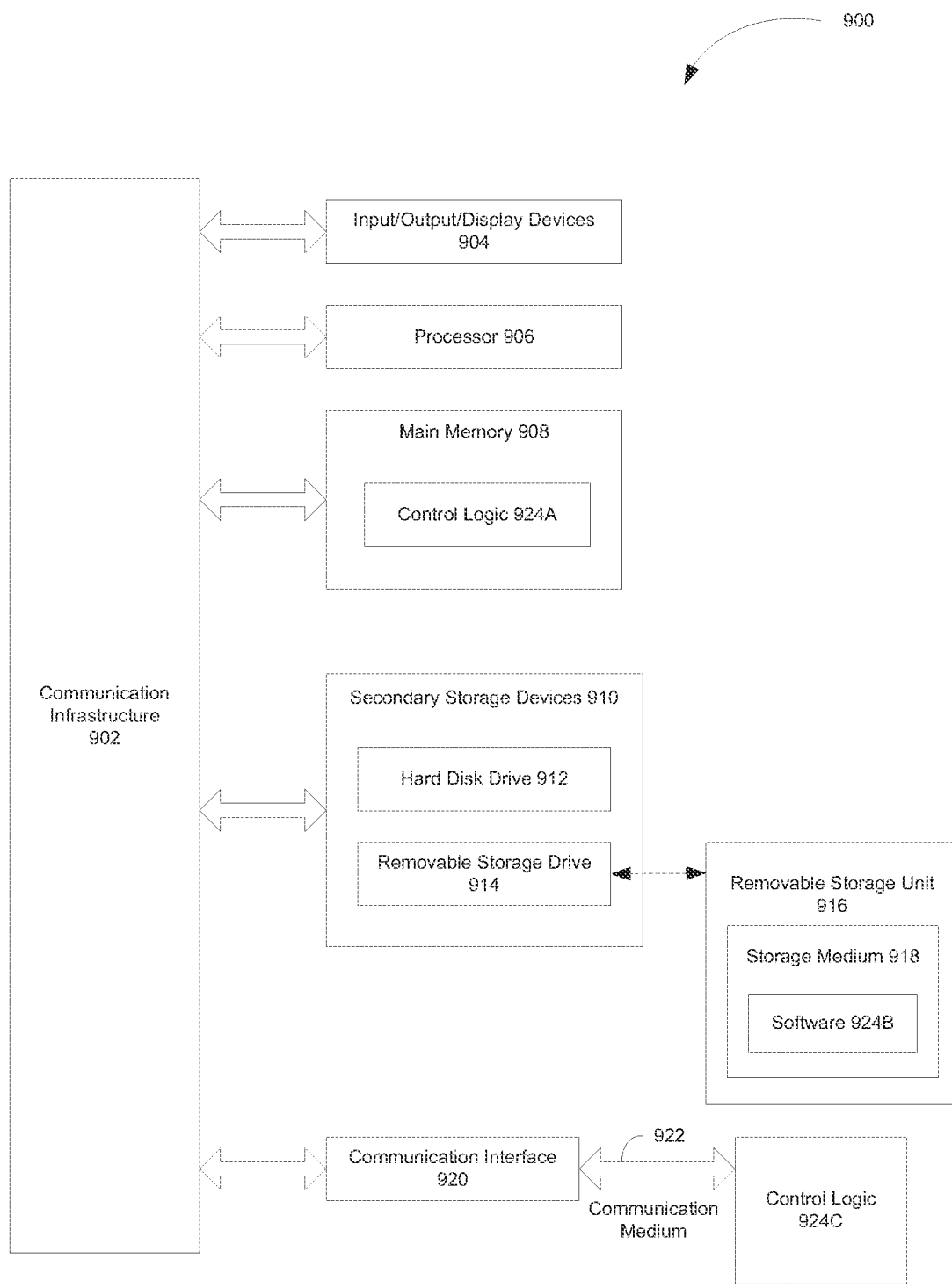
FIG. 9 is a block diagram of an example computer system that may be used to implement embodiments described herein.

The embodiments described herein, including systems, methods/processes, and/or apparatuses, may be implemented using well known servers/computers, such as computer 900 shown in FIG. 9. For instance, elements of trending topic identification module 104, topic identification and index generation module 126, and interest detection module 110 depicted in FIG. 1 and elements thereof, each of the steps of flowchart 300 depicted in FIG. 3, each of the steps of flowchart 500 depicted in FIG. 5, and each of the steps of flowchart 700 depicted in FIG. 7 can be implemented using one or more computers 900.

Computer 900 can be any commercially available and well known computer capable of performing the functions described herein, such as computers available from International Business Machines, Apple, Sun, HP, Dell, Cray, etc. Computer 900 may be any type of computer, including a desktop computer, a server, etc.

As shown in FIG. 9, computer 900 includes one or more processors (e.g., central processing units (CPUs)), such as processor 906. Processor 906 may include trending topic identification module 104, topic identification and index generation module 126, and/or interest detection module 110 of FIG. 1; content segmenting module 202, volume calculation module 204, and/or topic list generation module 206 of FIG. 2; content segmenting module 402, topic probability determination module 404, and/or concept/named entity-to-document mapping module 406 of FIG. 4; search history segmenting module 602, topic matching module 604, and/or content retriever module 606 of FIG. 6; or any portion or combination thereof, for example, through the scope of the embodiments is not limited in this respect. Processor 906 is connected to a communication infrastructure 902, such as a communication bus. In some embodiments, processor 906 can simultaneously operate multiple computing threads.

Computer 900 also includes a primary or main memory 908, such as a random access memory (RAM). Main memory has stored therein control logic 924A (computer software), and data.

Computer 900 also includes one or more secondary storage devices 910. Secondary storage devices 910 include, for example, a hard disk drive 912 and/or a removable storage device or drive 914, as well as other types of storage devices, such as memory cards and memory sticks. For instance, computer 900 may include an industry standard interface, such as a universal serial bus (USB) interface for interfacing with devices such as a memory stick. Removable storage drive 914 represents a floppy disk drive, a magnetic tape drive, a compact disk drive, an optical storage device, tape backup, etc.

Removable storage drive 914 interacts with a removable storage unit 916. Removable storage unit 916 includes a computer useable or readable storage medium 918 having stored therein computer software 924B (control logic) and/or data. Removable storage unit 916 represents a floppy disk, magnetic tape, compact disc (CD), digital versatile disc (DVD), Blu-ray disc, optical storage disk, memory stick, memory card, or any other computer data storage device. Removable storage drive 914 reads from and/or writes to removable storage unit 916 in a well-known manner.

Computer 900 also includes input/output/display devices 904, such as monitors, keyboards, pointing devices, etc.

Computer 900 further includes a communication or network interface 920. Communication interface 920 enables computer 900 to communicate with remote devices. For example, communication interface 920 allows computer 900 to communicate over communication networks or mediums 922 (representing a form of a computer useable or readable medium), such as local area networks (LANs), wide area networks (WANs), the Internet, etc. Communication interface 920 may interface with remote sites or networks via wired or wireless connections. Examples of communication interface 920 include but are not limited to a modem, a network interface card (e.g., an Ethernet card), a communication port, a Personal Computer Memory Card International Association (PCMCIA) card, etc.

Control logic 924C may be transmitted to and from computer 900 via the communication medium 922.

Any apparatus or manufacture comprising a computer useable or readable medium having control logic (software) stored therein is referred to herein as a computer program product or program storage device. This includes, but is not limited to, computer 900, main memory 908, secondary storage devices 910, and removable storage unit 916. Such computer program products, having control logic stored therein that, when executed by one or more data processing devices, cause such data processing devices to operate as described herein, represent embodiments of the invention.

For example, each of the elements of trending topic identification module 104, topic identification and index generation module 126, and interest detection module, each depicted in FIG. 1; content segmenting module 202, volume calculation module 204, and topic list generation module 206, each depicted in FIG. 2; content segmenting module 402, topic probability determination module 404, and concept/named entity-to-document mapping module 406, each depicted in FIG. 4; search history segmenting module 602, topic matching module 604, and content retriever module 606, each depicted in FIG. 6; each of the steps of flowchart 300 depicted in FIG. 3; each of the steps of flowchart 500 depicted in FIG. 5; and each of the steps of flowchart 700 depicted in FIG. 7 can be implemented as control logic that may be stored on a computer useable medium or computer readable medium, which can be executed by one or more processors to operate as described herein.

Computer readable storage media are distinguished from and non-overlapping with communication media. Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Example embodiments are also directed to such communication media.

VIII. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

The proper interpretation of subject matter described and claimed herein is limited to patentable subject matter under 35 U.S.C. § 101. As described and claimed herein, a method is a process defined by 35 U.S.C. § 101. As described and claimed herein, each of a device, apparatus, machine, system, computer, module, computer readable media, media, is a machine or manufacture defined by 35 U.S.C. § 101.

What is claimed is:

1. A method implemented on a machine having at least one processor, storage, and a communication platform connected to a network for providing content to a user, comprising:

obtaining, in response to a user logging into a web site, a search history of the user, wherein the search history comprises prior searches performed by the user;

determining one or more interests of the user based on the search history;

determining one or more trending topics associated with real-time content;

determining, in absence of a current query entered by the user when logging into the web site, at least one of the one or more interests that matches the one or more trending topics by:

identifying concepts and named entities from the search history, determining one or more of the identified concepts and named entities that match the one or more trending topics, for each of the one or more of the identified concepts and named entities that match the one or more trending topics:

summing probabilities assigned to the one or more of the identified concepts and named entities, wherein each of the one or more identified concepts and named entities has an associated probability for each of the one or more trending topics that represents a likelihood of the corresponding identified concept and named entity belonging to a respective topic of the one or more trending topics, and weighting the probabilities based on a user interest level in the corresponding identified concepts and named entities, computing a relevance value for each of the one or more of the identified concepts and named entities based on the weighted probabilities, wherein the relevance value is indicative of a level of relevance between a corresponding concept and named entity and a respective one of the one or more trending topics, and selecting at least one of the one or more of the identified concepts and named entities based on a relevance criterion as the at least one of the one or more interests in accordance with the relevance value for the at least one of the one or more of the identified concepts and named entities;

retrieving trending content related to each of the at least one of the one or more interests; and providing the trending content to the user.

2. The method of claim 1, wherein the search history comprises a history of one or more documents previously accessed by the user.

3. The method of claim 1, wherein determining the one or more trending topics comprises:

segmenting the real-time content, received from one or more real-time content sources, into concepts and entities.

4. The method of claim 1, wherein determining the at least one of the one or more interests comprises:
segmenting the search history to identify the concepts and named entities;
determining the user interest level in each of the identified concepts and named entities;
determining the one or more of the identified concepts and named entities that are matched to the one or more trending topics by determining at least one match between the identified concepts and named entities and concepts and named entities identified from the one or more trending topics, wherein selecting the at least one of the one or more of the identified concepts and named entities based on the relevance criterion comprises:
comparing each of the relevance values to a threshold value, wherein the at least one of the one or more of the identified concepts and named entities is selected based on a corresponding relevance value satisfying the threshold value.

5. The method of claim 1, wherein the search history comprises records of search-related activities of the user during a predetermined time interval.

6. The method of claim 1, wherein the retrieving comprises:
generating a topic index for one or more documents associated with the real-time content;
accessing the topic index to locate the one or more documents based on the at least one of the one or more interests;
generating a relevance value for each of the one or more documents; and
returning at least one document of the one or more documents based on a determination that a corresponding relevance value of a document is greater than a predetermined threshold level.

7. The method of claim 1, wherein the trending content is delivered to the user by providing the trending content on a home page of the user in response to the user logging into the web site.

8. The method of claim 1, wherein the one or more trending topics are identified from one or more real-time content sources.

9. The method of claim 1, wherein the trending content is provided to the user without receiving a search request from the user.

10. The method of claim 1, wherein determining the one or more trending topics comprises:
segmenting the real-time content into one or more additional concepts and named entities for a given time interval; and
applying a probabilistic topic model to the one or more additional concepts and named entities to determine a volume calculation.

11. The method of claim 1, wherein determining the at least one of the one or more interests comprises:
segmenting the search history to identify the concepts and named entities;
determining the user interest level for each of the one or more of the identified concepts and the named entities; and
determining a weight with respect to an age of each of the prior searches in the search history such that the user interest level is lowered as the age of a corresponding prior search increases.

12. The method of claim 1, wherein the real-time content is received during a first time interval, the method further comprising:
determining that the first time interval has expired;
receiving additional real-time content during a second time interval; and
determining one or more additional trending topics associated with the additional real-time content such that new trending topics are identified periodically.

13. A system for providing content to a user, comprising:
one or more processors;
an interest detection module, at least partially implemented by at least one of the one or more processors, that is configured to:
obtain, in response to a user logging into a web site, a search history of the user, wherein the search history comprises prior searches performed by the user,
determine one or more interests of the user based on the search history,
determine one or more trending topics associated with real-time content, and
determine, in absence of a current query entered by the user when logging into the web site, at least one of the one or more interests that matches the one or more trending topics by:
identifying concepts and named entities from the search history,
determining one or more of the identified concepts and named entities that match the one or more trending topics,
for each of the one or more of the identified concepts and named entities that match the one or more trending topics:
summing probabilities assigned to the one or more of the identified concepts and named entities, wherein each of the one or more identified concepts and named entities has an associated probability for each of the one or more trending topics that represents a likelihood of the corresponding identified concept and named entity belonging to a respective topic of the one or more trending topics, and
weighting the probabilities based on a user interest level in the corresponding identified concepts and named entities,
computing a relevance value for each of the one or more of the identified concepts and named entities based on the weighted probabilities, wherein the relevance value is indicative of a level of relevance between a corresponding concept and named entity and a respective one of the one or more trending topics, and
selecting at least one of the one or more of the identified concepts and named entities based on a relevance criterion as the at least one of the one or more interests in accordance with the relevance value for the at least one of the one or more of the identified concepts and named entities; and
a content retriever module, at least partially implemented by at least one of the one or more processors, that is configured to:
retrieve trending content related to each of the at least one of the one or more interests, and
provide the trending content to the user.

14. The system of claim 13, wherein the search history comprises a history of one or more documents previously accessed by the user.

15. The system of claim 13, wherein the one or more trending topics being determined comprises the interest detection module being further configured to:
segment the real-time content, received from one or more real-time content sources, into concepts and named entities.

16. The system of claim 15, wherein the interest detection module is further configured to:
generate a topic index for one or more documents associated with the real-time content;
access the topic index to locate the one or more documents based on the at least one of the one or more interests;
generate a relevance value for each of the one or more documents; and
return at least one document of the one or more documents based on a determination that a corresponding relevance value of a document is greater than a predetermined threshold level.

17. The system of claim 13, wherein the search history that is compared with the one or more trending topics stored in a database is limited to a predetermined time interval.

18. The system of claim 13, wherein the trending content is provided on a home page of the user in response to the user logging into the web site.

19. A machine-readable tangible and non-transitory medium having information recorded thereon, wherein the information, when read by the machine, causes the machine to perform the following:
obtaining, in response to a user logging into a web site, a search history of the user, wherein the search history comprises prior searched performed by the user;
determining one or more interests of the user based on the search history;
determining one or more trending topics associated with real-time content;
determining, in absence of a current query entered by the user when logging into the web site, at least one of the one or more interests that matches the one or more trending topics by:
identifying concepts and named entities from the search history,
determining one or more of the identified concepts and named entities that match the one or more trending topics,
for each of the one or more of the identified concepts and named entities that match the one or more trending topics:
summing probabilities assigned to the one or more of the identified concepts and named entities, wherein each of the one or more identified concepts and named entities has an associated probability for each of the one or more trending topics that represents a likelihood of the corresponding identified concept and named entity belonging to a respective topic of the one or more trending topics, and
weighting the probabilities based on a user interest level in the corresponding identified concepts and named entities,
computing a relevance value for each of the one or more of the identified concepts and named entities based on the weighted probabilities, wherein the relevance value is indicative of a level of relevance between a corresponding concept and named entity and a respective one of the one or more trending topics, and
selecting at least one of the one or more of the identified concepts and named entities based on a relevance criterion as the at least one of the one or more interests in accordance with the relevance value for the at least one of the one or more of the identified concepts and named entities;
retrieving trending content related to the at least one of the one or more interests; and
providing the trending content to the user.

20. The medium of claim 19, wherein the search history comprises a history of one or more documents previously accessed by the user.

21. The medium of claim 19, wherein the information, when read by the machine, further causes the machine to perform the following:
generating a topic index for one or more documents associated with the real-time content;
accessing the topic index to locate the one or more documents based on the at least one of the one or more interests;
generating a relevance value for each of the one or more documents; and
returning at least one document of the one or more documents based on a determination that a corresponding relevance value of a document is greater than a predetermined threshold level.

22. The medium of claim 19, wherein the one or more real-time content sources comprise at least one of: a microblog, a social networking, a news organization, and a current events web site.

23. The medium of claim 19, wherein the search history received is limited to a predetermined time interval.

24. The medium of claim 19, wherein the trending content is provided on a home page of the user in response to the user logging into the web site.

* * * * *